June 30, 1931.    K. BERGFELD    1,812,767
GAS WASHER
Filed May 16, 1928

Inventor:—

Patented June 30, 1931

1,812,767

UNITED STATES PATENT OFFICE

KARL BERGFELD, OF BERLIN, GERMANY

GAS WASHER

Application filed May 16, 1928, Serial No. 278,225, and in Germany November 26, 1926.

Gas washers with centrifugal discs rotating in opposite directions to one another are known, in which the washing liquid is atomized or sprayed in the form of a fine mist, the discs either being irrigated by the washing liquid or dipping into it. It has been found that in these washers, the mist produced is sufficiently fine to produce the requisite washing action only in a relatively small portion of the interior.

A substantially more powerful formation of mist is obtained according to the invention by irrigating the discs and at the same time causing them to dip into the liquid.

Such a washer is diagrammatically illustrated in the accompanying drawings in which:—

Figure 1:
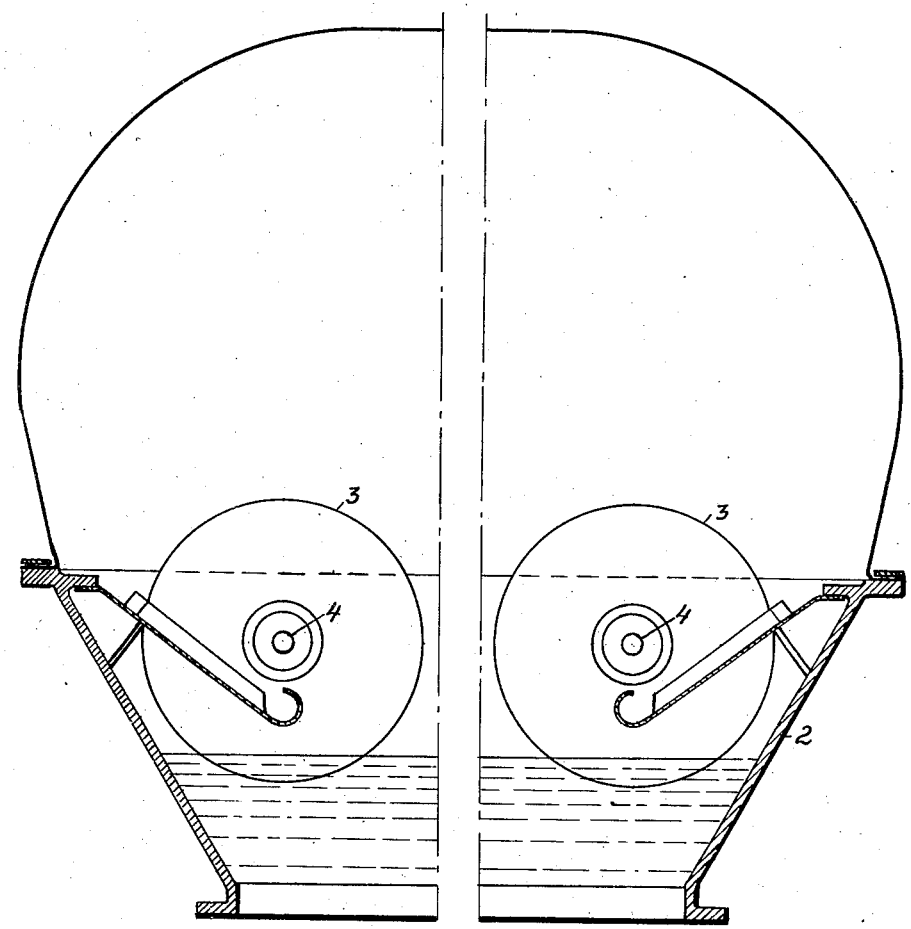

Figure 1 is a vertical section through the washer and

Figure 2:
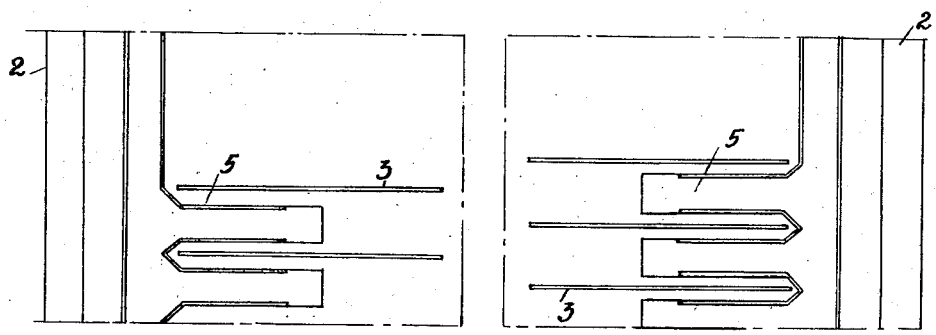

Figure 2 a plan, with the hood removed.

In the drawings, 2 is the casing of the washer, 3 are the centrifugal discs mounted on spindles 4 rotating in opposite directions, 5 are the supply troughs which are constituted by sheet metal plates mounted on the side walls of the washer and depending towards the center, a recess for each disc being provided in the said plates. Overflow of the liquid is prevented by an outer flange at the edges of each plate so that the liquid can only be fed on to the sides of the discs adjacent their centers from the lower ends of the plates.

The washing liquid is supplied to the troughs, projected upwards by the centrifugal discs and atomized. Part of the washing liquid dropping from the walls collects in the bottom of the casing 2 until the level of the liquid rises so high that the discs dip into it and it is thus further atomized. The portion of the liquid which drops from the walls back into the plate troughs is also atomized again until the liquid becomes enriched. The extent of treatment of the gases depends upon the quantity of the freshly introduced washing liquid and the speed of flow through the washer.

What I claim is:—

1. In a gas washer parallel series of rapidly rotating centrifugal disks rotatable in opposite directions; said disks dipping into a body of washing liquid; and irrigating means for feeding liquid to the sides of the disks at a point near the axis of rotation thereof.

2. In a gas washer, rapidly rotating centrifugal discs rotating in opposite directions and dipping into a body of washing liquid for the formation of a fine mist, means for collecting the mist and irrigating the sides of the discs therewith.

3. In a gas washer, a casing having a washing liquid holding tank in its lower end, and having a relatively large spraying chamber above the tank through which the gases to be washed are passed; centrifugal discs mounted for rotation and dipping into the liquid; means for rapidly rotating the disks for forming a fine mist in the spraying chamber; and means for irrigating the sides of the disks above the level of the liquid in the tank with the washing liquid.

4. In a gas washer as set forth in claim 3, said irrigating means comprising troughs for collecting the drain from the walls of the spraying chamber, and discharging upon the sides of the disks.

In testimony whereof I affix my signature.

KARL BERGFELD.